US012592388B2

(12) United States Patent
Tang et al.

(10) Patent No.: US 12,592,388 B2
(45) Date of Patent: Mar. 31, 2026

(54) NEGATIVE ELECTRODE PIECE AND SECONDARY BATTERY INCLUDING SAME

(71) Applicant: Zhuhai CosMX Battery Co., Ltd., Zhuhai (CN)

(72) Inventors: Weichao Tang, Zhuhai (CN); Suli Li, Zhuhai (CN); Wei Zhao, Zhuhai (CN); Hao Yuan, Zhuhai (CN); Chunyang Liu, Zhuhai (CN); Junyi Li, Zhuhai (CN); Yanming Xu, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 574 days.

(21) Appl. No.: 18/065,619

(22) Filed: Dec. 13, 2022

(65) Prior Publication Data

US 2023/0114529 A1 Apr. 13, 2023

Related U.S. Application Data

(63) Continuation of application No. PCT/CN2021/094179, filed on May 17, 2021.

(30) Foreign Application Priority Data

Jun. 29, 2020 (CN) ......................... 202010605261.1

(51) Int. Cl.

| | |
|---|---|
| ***H01M 4/62*** | (2006.01) |
| ***H01M 4/04*** | (2006.01) |
| ***H01M 4/134*** | (2010.01) |
| ***H01M 4/36*** | (2006.01) |
| ***H01M 4/38*** | (2006.01) |
| ***H01M 4/583*** | (2010.01) |
| ***H01M 10/0525*** | (2010.01) |
| *H01M 4/02* | (2006.01) |

(52) U.S. Cl.

CPC ......... *H01M 4/622* (2013.01); *H01M 4/0404* (2013.01); *H01M 4/134* (2013.01); *H01M 4/364* (2013.01); *H01M 4/386* (2013.01); *H01M 4/583* (2013.01); *H01M 10/0525* (2013.01); *H01M 2004/027* (2013.01)

(58) Field of Classification Search

CPC .... H01M 4/622; H01M 4/0404; H01M 4/386; H01M 4/134; H01M 4/583; H01M 2004/027; H01M 4/625; H01M 10/0525; H01M 4/364

See application file for complete search history.

(56) References Cited

U.S. PATENT DOCUMENTS

2009/0136845 A1 5/2009 Choi et al.

FOREIGN PATENT DOCUMENTS

| | | | |
|---|---|---|---|
| CN | 103985841 A | | 8/2014 |
| CN | 108011076 A | | 5/2018 |
| CN | 109071739 | * | 12/2018 |
| CN | 109071739 A | | 12/2018 |
| CN | 110137497 A | | 8/2019 |
| JP | 2003268053 A | | 9/2003 |
| KR | 20110111481 A | | 10/2011 |

OTHER PUBLICATIONS

The First Office Action dated Jul. 12, 2022 for Chinese Application No. 202010605261.1.

International Search Report and Written Opinion dated Aug. 17, 2021 for International Application No. PCT/CN2021/094179.

* cited by examiner

*Primary Examiner* — Laura Weiner

(57) ABSTRACT

A negative electrode piece and a secondary battery including the same. A type of polymer different from that in the prior art is selected as a component in the negative electrode piece, the polymer has high elasticity, high extensibility, can replace the polymer in the existing negative electrode piece, and can effectively improve and enhance the transmission performance of lithium ions and reduce the internal resistance of the lithium-ion battery. At the same time, it can effectively reduce side reactions caused by the expansion of the negative electrode piece, improve lithium conductive channels inside the negative electrode piece, and improve battery performance of the negative electrode piece during the battery cycling.

6 Claims, No Drawings

NEGATIVE ELECTRODE PIECE AND SECONDARY BATTERY INCLUDING SAME

CROSS-REFERENCE TO RELATED APPLICATION

This application is a continuation of International Application No. PCT/CN2021/094179, filed on May 17, 2021, which claims priority to Chinese Patent Application No. 202010605261.1, filed on Jun. 29, 2020, both of which are hereby incorporated by reference in their entireties.

TECHNICAL FIELD

The present disclosure relates to the technical field of secondary batteries, in particular to a negative electrode piece and a secondary battery including the negative electrode piece.

BACKGROUND

Lithium-ion batteries have been used in power vehicles, digital products and other fields, but in recent years, the energy density of lithium-ion batteries has not been greatly improved, which is mainly limited by the choice of negative electrode materials for lithium-ion batteries. At present, the negative electrode of lithium-ion battery mainly includes silicon negative electrode, carbon material negative electrode and lithium metal negative electrode. The lithium metal negative electrode is easy to produce lithium dendrite, has low coulomb efficiency, etc.; the carbon material negative electrode is widely used at present, but has low energy density; and the silicon negative electrode has a high capacity per gram, is an ideal battery material with high energy density, and is also a key development direction of lithium battery negative electrode. However, during the cycling of silicon negative electrode, there will be lithium alloying, SEI film continuous consumption, and electrode piece expansion, which will cause the destruction of lithium conductive network inside the electrode piece and lead to rapid deterioration of battery performance, thereby limiting the application of silicon negative electrode.

SUMMARY

In order to overcome the shortcomings of the prior art, especially in the process of charging and discharging of a lithium-ion battery, with the intercalation and deintercalation of lithium ions, the negative electrode piece has defects, such as, a large volume expansion, which leads to destruction of the conductive network in the negative electrode piece and affects performance of the lithium-ion battery, the present disclosure provides a negative electrode piece and a secondary battery containing the negative electrode piece.

It was found in research that the present disclosure adopts an in-situ polymerization method for preparing a high elastic and high extensible negative electrode piece, especially by introducing a polymer with high viscosity, high elasticity and high extensibility, and the use of the negative electrode piece can effectively reduce side reactions caused by the expansion of the electrode piece, improve lithium conductive channels inside the electrode piece, and improve battery performance of the negative electrode piece during the cycling of the lithium-ion battery.

The negative electrode piece in the present disclosure is particularly suitable for negative electrode pieces with high volume expansion rate, such as silicon based composite negative electrode piece or tin based negative electrode piece.

An object of the present disclosure is realized by the following technical solutions:

a negative electrode piece, including a negative-electrode current collector and a negative-electrode active material layer coated on one or both surfaces of the negative-electrode current collector, where the negative-electrode active material layer includes a negative-electrode active material, a conductive agent and a polymer, where the polymer includes a repeating unit as shown in Formula 1 below:

Formula 1

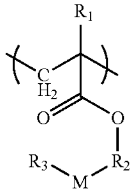

in Formula 1, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment.

According to the present disclosure, $R_2$ is a connecting group formed by reaction of hydroxyl group in

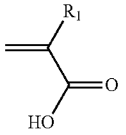

with $R_{3'}$ in

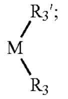

$R_3$ and $R_{3'}$ are the same or different, and are each independently selected from H, OH, COOH and $NH_2$ and other capping group that may react with hydroxyl group, and cannot be H at the same time.

According to the present disclosure, the polyphenylene oxide chain segment has a repeating unit shown in Formula 2:

Formula 2

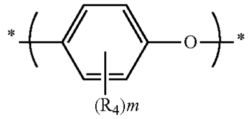

in Formula 2, $R_4$ is selected from H or $C_{1-6}$ alkyl group, and m is an integer between 0-4. Exemplarily, $R_4$ is selected from H or $C_{1-3}$ alkyl group, and m is an integer between 0-2;

the polyethylene glycol chain segment has a repeating unit shown in Formula 3:

Formula 3

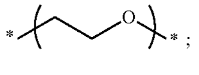

the polypropylene glycol chain segment has a repeating unit shown in Formula 4:

Formula 4

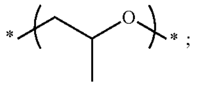

the polyethylene dithiol chain segment has a repeating unit shown in Formula 5:

Formula 5

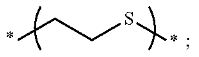

the polycarbonate chain segment has a repeating unit shown in Formula 6:

Formula 6

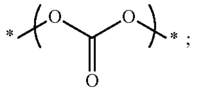

and the polysiloxane chain segment has a repeating unit shown in Formula 7:

Formula 7

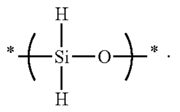

According to the present disclosure, the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

According to the present disclosure, a monomer for preparing the polymer is selected from a compound shown in Formula 8 below:

Formula 8

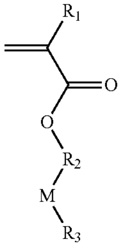

in Formula 8, $R_1$, $R_2$, $R_3$ and M are defined as above.

According to the present disclosure, the compound shown in Formula 8 is selected from at least one of polyphenylene oxide acrylate, polyethylene glycol methyl methacrylate, polycarbonate acrylate, polypropylene glycol methacrylate, poly(lithium-sulfonate) methacrylate, and polysiloxane methyl methacrylate.

According to the present disclosure, a number average molecular weight of M is 200-40000; and/or a number average molecular weight of the polymer is 1000-300000.

According to the present disclosure, the negative-electrode active material layer includes the following components in mass percentage of content:

70-98 wt % of negative-electrode active material, 1-15 wt % of conductive agent, 1-29 wt % of polymer and 0-10 wt % of binder.

According to the present disclosure, the negative-electrode active material is a silicon material or a mixture of a silicon material and a carbon material; where the silicon material is at least one of silicon-carbon, silicon and $SiO_x$ ($0<x<2$), and the carbon material is at least one of graphite, hard carbon, mesocarbon microbead and soft carbon.

The present disclosure further provides a lithium-ion battery, and the lithium-ion battery includes the negative electrode piece described above.

The beneficial effects of the present disclosure:

the present disclosure provides a negative electrode piece and a secondary battery containing the negative electrode piece. The present disclosure selects a type of polymer different from that of the prior art as a component in the negative electrode piece, the polymer has high elasticity and high extensibility, can replace the polymer in the existing negative electrode piece, and can effectively improve and enhance the transmission performance of lithium ions and reduce the internal resistance of the lithium-ion battery. At the same time, it can effectively reduce side reactions caused by the expansion of the negative electrode piece, improve lithium conductive channels inside the negative electrode piece, and improve battery performance of the negative electrode piece during the battery cycling.

DESCRIPTION OF EMBODIMENTS

<Negative Electrode Piece>

As above mentioned, the present disclosure provides a negative electrode piece, the negative electrode piece includes a negative-electrode current collector and a negative-electrode active material layer coated on one or both surfaces of the negative-electrode current collector, the negative-electrode active material layer includes a negative-electrode active material, a conductive agent and a polymer, where the polymer includes a repeating unit as shown in Formula 1 below:

Formula 1

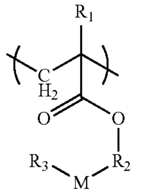

in Formula 1, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment.

In an embodiment of the present disclosure, $R_1$ is selected from H or $C_{1-3}$ alkyl group; for example, $R_1$ is selected from H or methyl.

In an embodiment of the present disclosure, $R_2$ is a connecting group formed by a reaction of hydroxyl group in

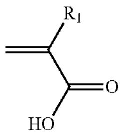

with $R_{3'}$ in

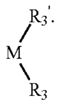

In essence, $R_2$ is a residue of $R_{3'}$, where $R_{3'}$ is a capping group of M.

In an embodiment of the present disclosure, $R_3$ and $R_{3'}$ are the same or different, and are each independently selected from a capping group that may react with hydroxyl group, such as, H, OH, COOH, $NH_2$, and cannot be H at the same time.

In an embodiment of the present disclosure, the polyphenylene oxide chain segment has a repeating unit shown in Formula 2:

Formula 2

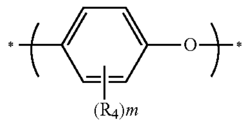

in Formula 2, $R_4$ is selected from H or $C_{1-6}$ alkyl group, and m is an integer between 0-4. Exemplarily, $R_4$ is selected from H or $C_{1-3}$ alkyl group, and m is an integer between 0-2; specifically, the polyphenylene oxide chain segment has a repeating unit shown in Formula 2':

Formula 2'

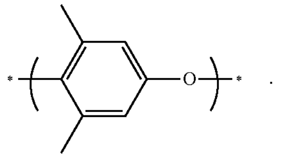

In an embodiment of the present disclosure, the polyethylene glycol chain segment has a repeating unit shown in Formula 3:

Formula 3

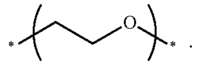

In an embodiment of the present disclosure, the polypropylene glycol chain segment has a repeating unit shown in Formula 4:

Formula 4

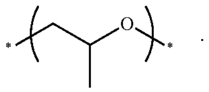

In an embodiment of the present disclosure, the polyethylene dithiol chain segment has a repeating unit shown in Formula 5:

Formula 5

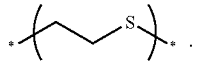

In an embodiment of the present disclosure, the polycarbonate chain segment has a repeating unit shown in Formula 6:

Formula 6

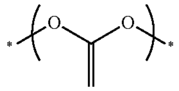

In an embodiment of the present disclosure, the polysiloxane chain segment has a repeating unit shown in Formula 7:

Formula 7

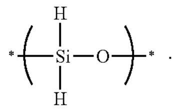

In an embodiment of the present disclosure, a number average molecular weight of M is 200-40000.

In an embodiment of the present disclosure, the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

In an embodiment of the present disclosure, a number average molecular weight of the polymer is 1000-300000, preferably 10000-200000.

In an embodiment of the present disclosure, a monomer for preparing the polymer is selected from a compound shown in Formula 8 below:

Formula 8

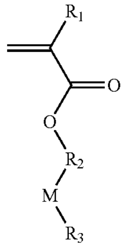

in Formula 8, $R_1$, $R_2$, $R_3$ and M are defined as above.

In an embodiment of the present disclosure, the compound shown in Formula 8 is selected from at least one of polyphenylene oxide acrylate, polyethylene glycol methyl methacrylate, polycarbonate acrylate, polypropylene glycol methacrylate, poly(lithium-sulfonate) methacrylate, and polysiloxane methyl methacrylate.

In an embodiment of the present disclosure, the negative-electrode active material layer includes the following components in mass percentage of content: 70-98 wt % of negative-electrode active material, 1-15 wt % of conductive agent, 1-29 wt % of above-mentioned polymer and 0-10 wt % of binder.

Exemplarily, a content of the negative-electrode active material in mass percentage is 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, or 98 wt %.

Exemplarily, a content of the conductive agent in mass percentage is 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %.

Exemplarily, a content of the polymer in mass percentage is 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, or 29 wt %.

Exemplarily, a content of the binder in mass percentage is 0 wt %, 1 wt %, 2 wt %, 3 wt %, 4 wt %, 5 wt %, 6 wt %, 7 wt %, 8 wt %, 9 wt %, or 10 wt %.

In an embodiment of the present disclosure, the negative-electrode active material is a silicon material or a mixture of a silicon material and a carbon material, where the silicon material is at least one of silicon-carbon, silicon, and $SiO_x$ ($0<x<2$), and the carbon material is at least one of graphite, hard carbon, mesocarbon microbead and soft carbon. Where if it is a mixture of a silicon material and a carbon material, the silicon material and carbon material are mixed in any ratio.

In an embodiment of the present disclosure, the conductive agent is selected from one or more of conductive carbon black, Ketjen black, conductive fiber, conductive polymer, acetylene black, carbon nanotube, graphene, flake graphite, conductive oxide and metal particle.

In an embodiment of the present disclosure, the binder is selected from at least one of polyvinylidene fluoride, polytetrafluoroethylene, polyacrylic acid, polyvinyl alcohol, polystyrene-butadiene rubber, polyimide, polyethyleneimine and polyacrylate.

In an embodiment of the present disclosure, a surface density of the negative electrode piece is 0.5-15 mg/$cm^2$.

<Preparation method of the Negative Electrode Piece>

The present disclosure also provides a preparation method of the negative electrode piece, including the following steps:

uniformly mixing a solvent, a negative-electrode active material, a conductive agent, a polymer monomer shown in Formula 8 and an initiator to prepare a negative electrode slurry; coating the negative electrode slurry on a surface of a negative-electrode current collector, and performing a drying treatment, to obtain the negative electrode piece.

In an embodiment of the present disclosure, the negative electrode slurry contains 200-1000 parts of solvent, 70-98 parts of negative-electrode active material, 1-15 parts of conductive agent, 1-29 parts of polymer monomer shown in Formula 8 and initiator, and 0-10 parts of binder, where an addition amount of the initiator is 0-1 wt %, not including 0, of a total mass of the polymer monomer shown in Formula 8.

In an embodiment of the present disclosure, the initiator can be one or more of azodiisobutyronitrile, azobisisoheptonitrile, dimethyl azodiisobutyrate, benzoyl peroxide, tert-butyl peroxybenzoate, 4-(N,N-dimethylamino) ethyl benzoate, methyl ortho-benzoylbenzoate, potassium persulfate, sodium persulfate, and ammonium persulfate, etc.

In an embodiment of the present disclosure, the solvent is selected from water, acetonitrile, benzene, toluene, xylene, acetone, tetrahydrofuran and hydrofluoroether.

In an embodiment of the present disclosure, the negative electrode slurry is preferably sieved negative electrode slurry, such as through a 200 mesh sieve.

In an embodiment of the present disclosure, a temperature of the drying treatment is 50° C.-110° C., and time of the drying treatment is 6-36 hours; preferably, the drying treatment is carried out under a vacuum condition.

It was found through research that for the negative electrode piece of the present disclosure, it is obtained by dissolving the negative-electrode active material, the conductive agent, optionally the binder, the polymer monomer, and the initiator into the solvent, uniformly mixing, and coating on the surface of the negative-electrode current collector, and then drying.

In the negative electrode slurry, the polymer monomer has small molecular weight and short polymer chain segment and thus can be fully mixed with the negative-electrode active material, conductive agent, and binder, and after the solvent is removed, a high efficient lithium conductive network has been formed in the negative-electrode active material layer, and the polymer monomer has fully entered into pores of each material. During the drying process of the electrode piece, the electrode piece is heated, and during the heating process, the polymer monomer is thermally polymerized inside the electrode piece due to high temperature. The polymer monomer is viscous liquid, semi-solid or solid at room temperature, and the polymer monomer becomes a flowable liquid at high temperature, which can fully contact each component in the negative electrode and immerse into the internal voids of the electrode piece to conduct thermal initiation polymerization in the voids, where the thermal initiation polymerization process (time and temperature) is adjustable to ensure the lithium conductivity of the negative electrode piece.

On the other hand, when the prepared lithium-ion battery containing the negative electrode piece expands in volume during the charging and discharging cycle, the polymer in the negative electrode piece of the present disclosure can fully bond the negative electrode slurry and effectively inhibit the volume expansion of the electrode piece, which can ensure that the negative electrode piece can conduct lithium efficiently during the charging and discharging process, and reduce the battery performance degradation caused by the expansion of the negative electrode piece.

<Lithium-Ion Battery>

The present disclosure also provides a lithium-ion battery, and the lithium-ion battery includes the negative electrode piece described above.

The present disclosure will be further described in detail below in combination with specific examples. It should be understood that the following examples are only to illustrate and explain the present disclosure, and should not be interpreted as a limitation on the scope of protection of the present disclosure. All technologies realized based on the above contents of the present disclosure are covered in the scope of protection of the present disclosure.

Unless otherwise specified, the experimental methods used in the following examples are conventional methods; reagents, materials, and the like. used in the following examples can be obtained from commercial sources unless otherwise specified.

Example 1

1) Preparation of Positive Electrode Piece:

95 g of lithium cobaltate as positive-electrode active material, 2 g of polyvinylidene fluoride (PVDF) as binder, 2 g of carbon black as conductive agent, and 1 g of carbon nanotube as conductive agent were mixed together, and 1000 g of N-methyl pyrrolidone (NMP) was added, and stirring under the action of a vacuum mixer until the mixed system become a uniform flowable positive electrode slurry; the positive electrode slurry is applied evenly on an aluminum foil with a thickness of 9-12 μm; after drying at 100° C. for 36 hours, the electrode piece was obtained after vacuumization, and then the electrode piece was rolled and cut to obtain the positive electrode piece.

2) Preparation of Negative Electrode Piece:

70 g of $SiO_x$ (0<x<2), 5 g of single-walled carbon nanotube (SWCNT) as conductive agent, 3 g of conductive carbon black (SP) as conductive agent, 20 g of polyethylene glycol methyl methacrylate, 0.01 g of ammonium persulfate, 1 g of sodium carboxymethyl cellulose (CMC, 1 g of styrene butadiene rubber (SBR) as binder, and 500 g of deionized water were made into slurry by wet process, and then the slurry was coated on a surface of a copper foil for negative-electrode current collector, and then dried, rolled and die-cut to obtain the negative electrode piece.

3) Preparation of Electrolyte:

In a glove box filled with argon with qualified water and oxygen contents, ethylene carbonate, propylene carbonate, diethyl carbonate and n-propyl propionate were mixed evenly in a ratio of 20:10:15:55 by mass, then 1 mol/L of fully dried lithium hexafluorophosphate ($LiPF_6$) of was rapidly added, and stirred evenly, to prepare the electrolyte.

4) Preparation of Lithium-Ion Battery

The positive electrode piece and the negative electrode piece, as obtained above, and a separator were used to prepare a lithium-ion battery cell, which was injected with the electrolyte, encapsulated and welded, to obtain the lithium-ion battery.

Comparative Example 1-1

A specific process may refer to Example 1, where a main difference is that polyethylene glycol with the same mass as polyethylene glycol methyl methacrylate monomer is used to replace polyethylene glycol methyl methacrylate in Example 1; and other conditions are the same as Example 1.

Comparative Example 1-2

A specific process may refer to Example 1, where a main difference is that, polyethylene glycol and polymethyl methacrylate, as a mixture with the same mass as polyethylene glycol methyl methacrylate monomer, is used in Comparative example 1-2 to replace polyethylene glycol methyl methacrylate in Example 1, where a mass ratio of polyethylene glycol and polymethyl methacrylate is a molecular weight ratio of polyethylene glycol to polymethyl methacrylate in polyethylene glycol methyl methacrylate monomer; and other conditions are the same as Example 1.

Other Examples and Other Comparative Examples

Specific processes may refer to Example 1, where main differences are process conditions of the negative electrode pieces, addition amounts of respective components, and types of respective component materials. See Table 1 and Table 2 for details. Among them, Examples 1-6 in Table 1 further contain 0.01 g of ammonium persulfate as initiator. In the comparative examples in Table 2 where two polymers are added, addition amounts of the two polymers is a molecular weights ratio of polymer chain segments to poly (meth)acrylate in polymer monomers added in corresponding examples. See description of the above Comparative example 1-2 for details.

TABLE 1

| No. | Solvent/g | Negative-electrode active material/g | Conductive agent/g | Polymer or monomer thereof/g | Binder/g | Drying temperature (° C.) | Drying time (h) |
|---|---|---|---|---|---|---|---|
| Example 1 | 500 | 70 | 8 | 20 | 2 | 95 | 5 |
| Comparative example 1-1 | 500 | 70 | 8 | 20 | 2 | 95 | 5 |
| Comparative example 1-2 | 500 | 70 | 8 | 20 | 2 | 95 | 5 |
| Example 2 | 200 | 95 | 1 | 3 | 1 | 110 | 16 |
| Comparative example 2-1 | 200 | 95 | 1 | 3 | 1 | 110 | 16 |

TABLE 1-continued

| No. | Solvent/g | Negative-electrode active material/g | Conductive agent/g | Polymer or monomer thereof/g | Binder/g | Drying temperature (° C.) | Drying time (h) |
|---|---|---|---|---|---|---|---|
| Comparative example 2-2 | 200 | 95 | 1 | 3 | 1 | 110 | 16 |
| Example 3 | 400 | 85 | 3 | 12 | 0 | 80 | 30 |
| Comparative example 3-1 | 400 | 85 | 3 | 12 | 0 | 80 | 30 |
| Comparative example 3-2 | 400 | 85 | 3 | 12 | 0 | 80 | 30 |
| Example 4 | 700 | 90 | 2 | 7 | 1 | 90 | 24 |
| Comparative example 4-1 | 700 | 90 | 2 | 7 | 1 | 90 | 24 |
| Comparative example 4-2 | 700 | 90 | 2 | 7 | 1 | 90 | 24 |
| Example 5 | 450 | 80 | 3 | 12 | 0.5 | 100 | 8 |
| Comparative example 5-1 | 450 | 80 | 3 | 12 | 0.5 | 100 | 8 |
| Comparative example 5-2 | 450 | 80 | 3 | 12 | 0.5 | 100 | 8 |
| Example 6 | 400 | 75 | 5 | 15 | 5 | 80 | 30 |
| Comparative example 6-1 | 400 | 75 | 5 | 15 | 5 | 80 | 30 |
| Comparative example 6-2 | 400 | 75 | 5 | 15 | 5 | 80 | 30 |

TABLE 2

| No. | Positive-electrode active material | Negative-electrode active material | Conductive agent | Polymer monomer/polymer | Binder |
|---|---|---|---|---|---|
| Example 1 | Lithium cobaltate | $SiO_x$ ($0 < x < 2$) | Conductive carbon black + carbon nanotube (3:5) | Polyethylene glycol methyl methacrylat (molecular weight of monomer 2000; molecular weight of polymer 100000) | CMC + SBR(1:1) |
| Comparative example 1-1 | | | | Polyethylene glycol (molecular weight 100000) | |
| Comparative example 1-2 | | | | Polyethylene glycol (molecular weight 100000) + polymethacrylate (molecular weight 100000) | |
| Example 2 | Ferrous lithium phosphate | Silicon + graphite (1:2) | Conductive carbon black + Ketjen black (2:1) | Polyphenylene oxide acrylate (molecular weight of monomer 500; molecular weight of polymer 80000) | Polyvinylidene fluoride |
| Comparative example 2-1 | | | | Polyphenylene oxide (molecular weight 80000) | |
| Comparative example 2-2 | | | | Polyphenylene oxide (molecular weight 80000) + polyacrylate (molecular weight 80000) | |
| Example 3 | Lithium rich manganese based material | Silicon + silicon-carbon (3:2) | Conductive fiber + carbon nanotube (1:1) | Polycarbonate acrylate (molecular weight of monomer 1500; molecular weight of polymer120000) | None |
| Comparative example 3-1 | | | | Polycarbonate (molecular weight 120000) | |
| Comparative example 3-2 | | | | Polycarbonate (molecular weight 120000) + polyacrylate (molecular weight 120000) | |
| Example 4 | Nickel-cobalt-manganese ternary material | $SiO_x$ ($0 < x < 2$) + silicon-carbon (4:1) | Carbon nanotube + graphene (1:2) | Polyethylene glycol methyl methacrylate (molecular weight of monomer 950; molecular weight of polymer 180000) | Polyvinyl alcohol |
| Comparative example 4-1 | | | | Polyethylene glycol (molecular weight: 180000) | |
| Comparative example 4-2 | | | | Polyethylene glycol (molecular weight 180000); polymethacrylate (molecular weight 180000) | |
| Example 5 | Nickel-cobalt-aluminum ternary | $SiO_x$ ($0 < x < 2$) + graphite (5:1) | Conductive carbon black + carbon | Polypropylene glycol methacrylate (molecular weight of monomer 3000; molecular weight of polymer 200000) | Polyimide |

TABLE 2-continued

| No. | Positive-electrode active material | Negative-electrode active material | Conductive agent | Polymer monomer/polymer | Binder |
|---|---|---|---|---|---|
| Comparative example 5-1 | material | | nanotube (2:1) | Polypropylene glycol (molecular weight 200000) | |
| Comparative example 5-2 | | | | Polypropylene glycol (molecular weight 200000) + polymethacrylate (molecular weight 200000) | |
| Example 6 | Nickel-cobalt-manganese | $SiO_x$ (0 < x < 2) + silicon (8:1) | Carbon nanotube + flake | Polysiloxane methyl methacrylate (molecular weight of monomer 600; molecular weight of polymer 50000) | Polyacrylic acid |
| Comparative example 6-1 | ternary material | | graphite (3:1) | Polysiloxane (molecular weight 50000) | |
| Comparative example 6-2 | | | | Polysiloxane (molecular weight 50000) + polymethacrylate (molecular weight 50000) | |

Performance tests are conducted for the above examples and comparative example.

Test method for battery internal resistance alternating current impedance: alternating current impedance for 50% of SOC lithium-ion battery is tested in 100 KHz-0.1 mHz range at 60° C., using Metrohm PGSTAT302N chemical workstation.

Test method for battery cycling performance: a charge and discharge cycling test for the lithium-ion battery is conducted on a battery (from LANHE) charging and discharging test cabinet with the test conditions being 25° C., 0.5 C/0.5 C charge and discharge.

(1) Comparison of Internal Resistance Data in EIS (Electrochemical Impedance Spectroscopy) During Battery Cycling

| No. | Internal resistance of battery after 100 cycles (mΩ) | Internal resistance of battery after 200 cycles (mΩ) | Internal resistance of battery after 300 cycles (mΩ) | Internal resistance of battery after 400 cycles (mΩ) |
|---|---|---|---|---|
| Example 1 | 2.55 | 2.73 | 3.08 | 3.49 |
| Comparative example 1-1 | 3.45 | 3.78 | 4.17 | 4.61 |
| Comparative example 1-2 | 3.86 | 4.16 | 4.52 | 5.11 |
| Example 2 | 1.75 | 2.16 | 2.68 | 3.16 |
| Comparative example 2-1 | 2.21 | 3.02 | 3.91 | 5.03 |
| Comparative example 2-2 | 2.52 | 3.46 | 4.49 | 5.52 |
| Example 3 | 3.61 | 3.81 | 4.21 | 4.71 |
| Comparative example 3-1 | 4.25 | 4.78 | 5.17 | 5.66 |
| Comparative example 3-2 | 4.51 | 5.10 | 5.62 | 6.41 |
| Example 4 | 3.12 | 3.41 | 3.81 | 4.43 |
| Comparative example 4-1 | 3.31 | 3.89 | 4.47 | 5.15 |
| Comparative example 4-2 | 3.72 | 4.33 | 5.01 | 5.83 |
| Example 5 | 1.82 | 2.23 | 2.82 | 3.62 |
| Comparative example 5-1 | 2.35 | 3.01 | 3.77 | 4.52 |
| Comparative example 5-2 | 2.62 | 3.46 | 4.01 | 4.92 |
| Example 6 | 2.21 | 2.51 | 2.89 | 3.32 |
| Comparative example 6-1 | 2.75 | 3.18 | 3.71 | 4.52 |
| Comparative example 6-2 | 3.11 | 3.72 | 4.56 | 5.42 |

(2) Comparison of Cycle Capacity Retention Rate Data of Battery Under 0.5 C/0.5 C

| No. | Capacity retention rate of battery after 100 cycles (% of) | Capacity retention rate of battery after 300 cycles (% of) | Capacity retention rate of battery after 500 cycles (% of) | Capacity retention rate of battery after 700 cycles (% of) |
|---|---|---|---|---|
| Example 1 | 98.32 | 94.51 | 90.25 | 86.53 |
| Comparative example 1-1 | 97.24 | 91.47 | 86.46 | 81.21 |
| Comparative example 1-2 | 96.42 | 88.97 | 81.59 | 74.21 |
| Example 2 | 99.07 | 97.23 | 95.34 | 93.42 |
| Comparative example 2-1 | 98.63 | 95.82 | 93.08 | 90.34 |
| Comparative example 2-2 | 98.34 | 94.96 | 91.52 | 88.21 |
| Example 3 | 97.12 | 91.23 | 85.36 | 79.52 |
| Comparative example 3-1 | 96.27 | 88.63 | 81.03 | 73.41 |
| Comparative example 3-2 | 95.47 | 86.47 | 77.42 | 68.25 |
| Example 4 | 98.61 | 95.71 | 92.38 | 90.03 |
| Comparative example 4-1 | 98.12 | 94.14 | 90.25 | 86.39 |
| Comparative example 4-2 | 97.31 | 91.92 | 86.52 | 81.24 |
| Example 5 | 98.51 | 95.62 | 92.56 | 89.73 |
| Comparative example 5-1 | 97.82 | 92.48 | 92.68 | 84.62 |
| Comparative example 5-2 | 97.52 | 92.51 | 87.49 | 82.47 |
| Example 6 | 98.64 | 95.95 | 93.43 | 90.52 |
| Comparative example 6-1 | 97.98 | 93.91 | 89.84 | 85.81 |
| Comparative example 6-2 | 97.48 | 92.31 | 86.97 | 81.73 |

The internal resistance test results during the battery cycling show that the polymer used in the examples of the present disclosure can effectively bond the negative-electrode active material, conductive agent and binder together in the negative electrode piece, and the polymer has a comb structure, with the branch chain being lithium-conductible, and thus the negative electrode pieces prepared in Examples 1-6 have low internal resistance during the cycling; while the polymers in the comparative examples are not lithium-conductible and is easy to dissolve in the electrolyte, which causes some particles of the electrode piece to fall off, thus the batteries prepared in the comparative examples have high internal resistances during the cycling.

The results of cycling performance tests for the examples and the comparative examples show that the comb polymers in the negative electrode piece of the present disclosure can effectively buffer the expansion of the negative-electrode active material in the negative electrode piece to effectively reduce the expansion of the battery in the cycling process, and the internal resistance of the battery in the cycling process is small, which makes the cycling performance of the batteries prepared have advantages. However, the polymers in the comparative examples have a linear structure, and is very easy to dissolve in the electrolyte, and especially in the battery cycling, the particles of the electrode piece are easy to fall off and the SEI (Solid Electrolyte Interface) film is seriously thickened, which causes a large internal resistance of the battery, leading to a significant reduction in the effective cycle times of the prepared batteries.

The results of charge and discharge cycling performance tests for the examples and the comparative examples show that the negative electrode piece of the present disclosure has a small internal resistance, and during the cycling, the lithium ions have a good lithium conductive channel in the negative electrode piece, and thus the prepared lithium-ion batteries have good cycling performance.

The embodiments of the present disclosure have been described above. However, the present disclosure is not limited to the above embodiments. Any modification, equivalent replacement, improvement, and the like made within the spirit and principle of the present disclosure shall be included in the protection scope of the present disclosure.

What is claimed is:

1. A negative electrode piece, comprising a negative-electrode current collector and a negative-electrode active material layer coated on one or both surfaces of the negative-electrode current collector, the negative-electrode active material layer comprising a negative-electrode active material, a conductive agent and a polymer, wherein the polymer comprises a repeating unit as shown in Formula 1 below:

Formula 1

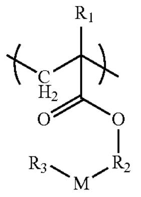

in Formula 1, $R_1$ is selected from H or $C_{1-6}$ alkyl group; $R_2$ is selected from a connecting group; $R_3$ is selected from a capping group; M is a polyphenylene oxide chain segment; and the polyphenylene oxide chain segment has a repeating unit shown in Formula 2:

Formula 2

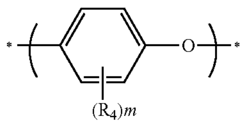

in Formula 2, $R_4$ is selected from H or $C_{1-3}$ alkyl group, and m is an integer between 0-2, wherein $R_2$ is a connecting group formed by a reaction of hydroxyl group in

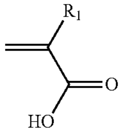

with $R_{3'}$ in

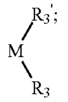

$R_3$ and $R_{3'}$ are same or different, and are each independently selected from H, OH, COOH and $NH_2$ and are not H at the same time.

2. The negative electrode piece according to claim 1, wherein the polymer is polyphenylene oxide polyacrylate.

3. The negative electrode piece according to claim 1, wherein the negative-electrode active material layer comprises the following components in mass percentage of content:

70-98 wt % of the negative-electrode active material, 1-15 wt % of the conductive agent, 1-29 wt % of the polymer and 0-10 wt % of a binder.

4. The negative electrode piece according to claim 1, wherein the negative-electrode active material comprises a silicon material or a mixture of a silicon material and a carbon material; wherein the silicon material is at least one of silicon-carbon, silicon, and $SiO_x$ ($0<x<2$), and the carbon material is at least one of graphite, hard carbon, mesocarbon microbead, and soft carbon.

5. The negative electrode piece according to claim 1, wherein a number average molecular weight of M is 200-40000; and/or a number average molecular weight of the polymer is 1000-300000.

6. A lithium-ion battery, comprising the negative electrode piece according to claim 1.

* * * * *